(12) United States Patent
Myung et al.

(10) Patent No.: US 10,248,165 B2
(45) Date of Patent: Apr. 2, 2019

(54) FOLDABLE PLATE AND FOLDABLE DISPLAY DEVICE WITH THE SAME

(71) Applicant: LG Display Co., Ltd., Seoul (KR)

(72) Inventors: Noh Jin Myung, Gyeonggi-do (KR); Se Jin Jang, Gyeonggi-do (KR); Tae Hyoung Kwak, Gyeonggi-do (KR)

(73) Assignee: LG Display Co., Ltd., Seoul (KR)

( * ) Notice: Subject to any disclaimer, the term of this patent is extended or adjusted under 35 U.S.C. 154(b) by 0 days.

(21) Appl. No.: 16/032,196

(22) Filed: Jul. 11, 2018

(65) Prior Publication Data

US 2018/0321710 A1 Nov. 8, 2018

Related U.S. Application Data

(62) Division of application No. 14/982,644, filed on Dec. 29, 2015, now Pat. No. 10,042,394.

(30) Foreign Application Priority Data

Dec. 31, 2014 (KR) .................. 10-2014-0195837
May 29, 2015 (KR) .................. 10-2015-0075816

(51) Int. Cl.
*G02F 1/1333* (2006.01)
*G06F 1/16* (2006.01)

(52) U.S. Cl.
CPC .................. *G06F 1/1652* (2013.01)

(58) Field of Classification Search
CPC .................................. G02F 1/1333
See application file for complete search history.

(56) References Cited

U.S. PATENT DOCUMENTS

| 2013/0286462 | A1 | 10/2013 | Yeo et al. |
| 2014/0029171 | A1 | 1/2014 | Lee |
| 2014/0029212 | A1 | 1/2014 | Hwang et al. |
| 2014/0287213 | A1* | 9/2014 | Lee .................. G02F 1/133308 |
| | | | 428/217 |
| 2014/0300529 | A1 | 10/2014 | Kim et al. |
| 2015/0277110 | A1* | 10/2015 | Oh .................. G06F 3/0412 |
| | | | 359/513 |

FOREIGN PATENT DOCUMENTS

| CN | 103578356 A | 2/2014 |
| CN | 103985338 A | 8/2014 |
| EP | 2 690 521 A1 | 1/2014 |
| GB | 2 360 622 A | 9/2001 |

OTHER PUBLICATIONS

Chinese Office Action dated Dec. 5, 2017, issued in corresponding Chinese Application No. 201511021010.4.

* cited by examiner

*Primary Examiner* — Jerry Wu
(74) *Attorney, Agent, or Firm* — Morgan, Lewis & Bockius LLP

(57) ABSTRACT

Provided are a foldable plate and a foldable display device with the same. A foldable plate includes: a first area including a first material having a first elastic modulus, a second area including the first material, the second area being separate from the first area, a third area including a second material having a second elastic modulus lower than the first elastic modulus, the third area being interposed between the first area and the second area.

6 Claims, 14 Drawing Sheets

FOLDABLE PLATE AND FOLDABLE DISPLAY DEVICE WITH THE SAME

CROSS-REFERENCE TO RELATED APPLICATION(S)

This application is a divisional of Ser. No. 14/982,644, filed on Dec. 29, 2015, which claims the benefit of Korean Patent Application No. 10-2014-0195837, filed on Dec. 31, 2014, and Korean Patent Application No. 10-2015-0075816, filed on May 29, 2015, the entire disclosure of each of which is hereby incorporated by reference herein for all purposes.

BACKGROUND

1. Technical Field

The present disclosure relates to a foldable plate and foldable display device with the same.

2. Discussion of the Related Art

Nowadays, public demand is increasing for applying a large-sized screen in portable devices, such as mobile phones, tablet personal computers and so on. As such, the general public shows a keen interest in foldable display devices. Foldable display devices have features of easier portability, a larger-sized screen, etc. than a non-foldable display device.

Such a foldable display device may also include plates, such as a cover window, a back plate, and so on. The plates must be formed in a foldable structure. To this end, the plate is being formed in a very thin thickness or in a multi-layered structure.

The thin plate is easily affected by an impact. Also, the thin plate must transfer the impact to elements of a display panel. Because of this, some elements may be damaged by the transferred impact. Furthermore, dark spots may be caused by the damaged elements. Moreover, the thin plate may not maintain an original shape because of its weak elastic restoring force.

On the other hand, a thin plate with a multi-layered structure may better endure an impact. However, a connection area (or a hinge area) of each layer of the multi-layered plate is visible. Due to this, a dark line is generated in a central portion of the display panel in conventional multi-layered plate foldable display devices.

SUMMARY

Accordingly, the present disclosure is directed to a foldable plate and foldable display device with the same that substantially obviate one or more of the problems due to limitations and disadvantages of the related art.

An object of the present disclosure is to provide a foldable plate and foldable display device with the same that may prevent the waviness and the optical distortion without damaging elements. Another object of the present disclosure is to provide a foldable plate and foldable display device with the same that may prevent the generation of waviness and optical distortions in both surfaces of the foldable display device which is unfolded from a folded state Additional features and advantages will be set forth in the description which follows, and in part will be apparent from the description, or may be learned by practice of the invention. The objectives and other advantages of the disclosure will be realized and attained by the structure particularly pointed out in the written description and claims thereof as well as the appended drawings.

To achieve these and other advantages and in accordance with the purpose of the present disclosure, as embodied and broadly described, there is provided a foldable plate, including: a first area including a first material having a first elastic modulus, a second area including the first material, the second area being separate from the first area, a third area including a second material having a second elastic modulus lower than the first elastic modulus, the third area being interposed between the first area and the second area.

In another aspect, there is provided a foldable display device, comprising: a display panel, and a cover window on the display panel, the cover window including: a first area including a first material having a first elastic modulus, a second area including the first material, the second area being separate from the first area, and a third area including a second material having a second elastic modulus lower than the first elastic modulus, the third area being interposed between the first area and the second area.

Other systems, methods, features and advantages will be, or will become, apparent to one with skill in the art upon examination of the following figures and detailed description. It is intended that all such additional systems, methods, features and advantages be included within this description, be within the scope of the present disclosure, and be protected by the following claims. Nothing in this section should be taken as a limitation on those claims. Further aspects and advantages are discussed below in conjunction with the embodiments. It is to be understood that both the foregoing general description and the following detailed description of the present disclosure are examples and explanatory, and are intended to provide further explanation of the disclosure as claimed.

BRIEF DESCRIPTION OF THE DRAWINGS

The accompanying drawings, which are included to provide a further understanding of the invention and are incorporated in and constitute a part of this specification, illustrate implementations of the invention and together with the description serve to explain the principles of the invention.

Figure 1:
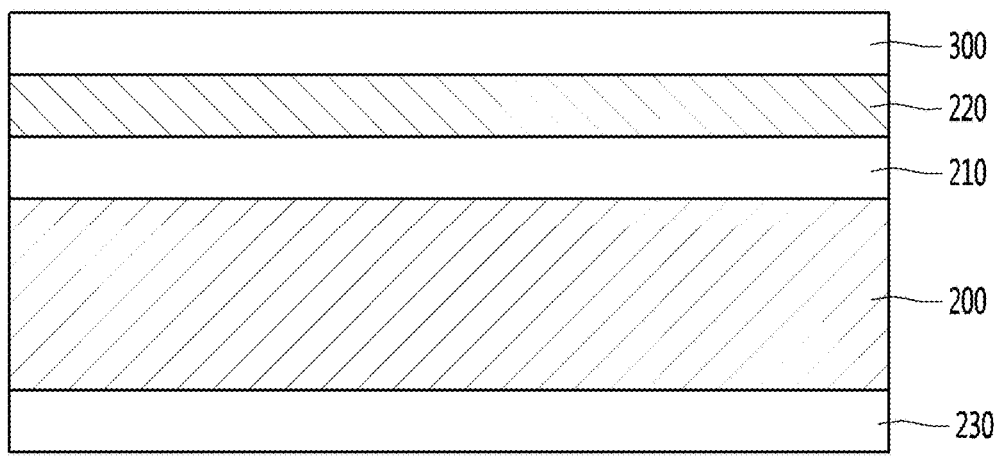
FIG. 1 is a cross-sectional view showing a foldable display device according to a first example embodiment of the present disclosure.

Throughout the drawings and the detailed description, unless otherwise described, the same drawing reference numerals should be understood to refer to the same elements, features, and structures. The relative size and depiction of these elements may be exaggerated for clarity, illustration, and convenience.

DETAILED DESCRIPTION

Reference will now be made in detail to embodiments of the present disclosure, examples of which are illustrated in the accompanying drawings. In the following description, when a detailed description of well-known functions or configurations related to this document is determined to unnecessarily cloud a gist of the invention, the detailed description thereof will be omitted. The progression of processing steps and/or operations described is an example; however, the sequence of steps and/or operations is not limited to that set forth herein and may be changed as is known in the art, with the exception of steps and/or operations necessarily occurring in a certain order. Like reference numerals designate like elements throughout. Names of the respective elements used in the following explanations are selected only for convenience of writing the specification and may be thus different from those used in actual products.

In the description of embodiments, when a structure is described as being positioned "on or above" or "under or below" another structure, this description should be construed as including a case in which the structures contact each other as well as a case in which a third structure is disposed therebetween.

Hereinafter, example embodiments of the present disclosure will be described in detail with reference to the accompanying drawings.

Figure 2:
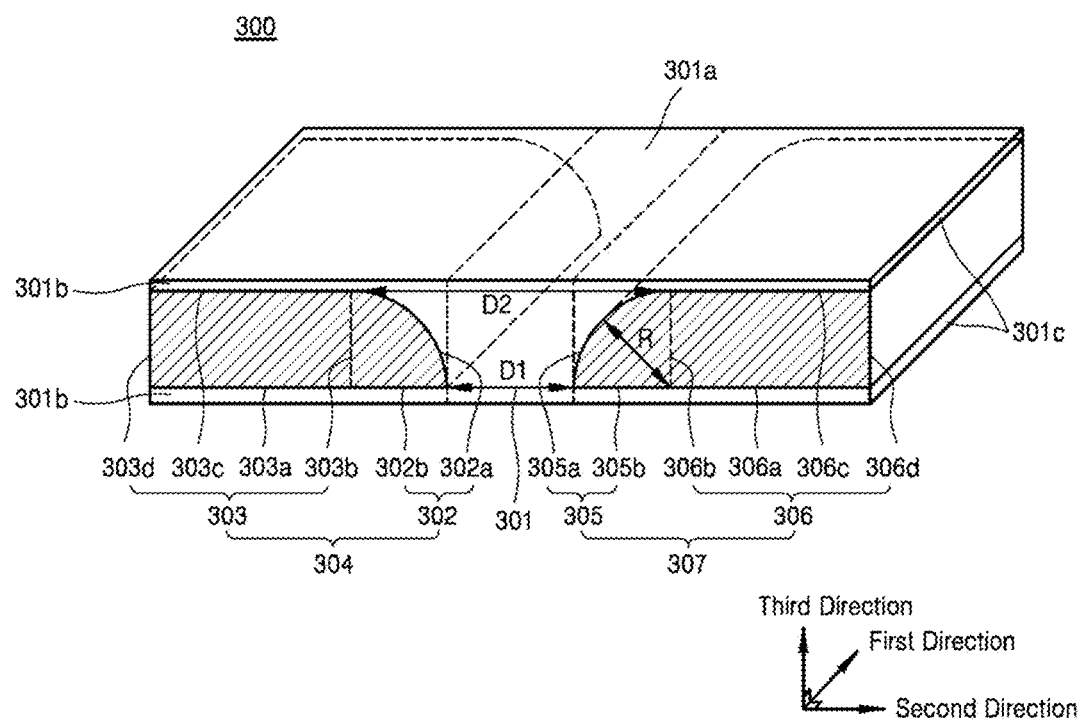
FIG. 2 is a perspective view showing a foldable plate according to a first example embodiment of the present disclosure.

FIG. 1 is a cross-sectional view showing a foldable display device according to a first example embodiment of the present disclosure. FIG. 2 is a perspective view showing a foldable plate according to a first example embodiment of the present disclosure. With reference to FIGS. 1 and 2, the foldable display device according to an embodiment of the present disclosure may include an upper plate 300, a display panel 200, and a lower plate 230.

The upper plate 300 may be overlap the display panel 200. The lower plate 230 may overlap a rear surface of the display panel 200. The display panel 200 may be a foldable display panel, which may be included in a foldable display device. The upper plate 300 and the lower plate 230 may be foldable plates which may be completely folded. The upper plate 300 may be used as a foldable cover window, and the lower plate 230 may be used as a foldable back plate.

Also, the foldable display device may include a touch panel 210 and a polarizing plate 220, which may be interposed between the display panel 200 and the upper plate 300. The touch panel 210 may be disposed on the display panel 200, and the polarizing plate 220 may be disposed on the touch panel 210. The touch panel 210 and the polarizing plate 220 may be flexibly formed (or fabricated) to provide the foldable display device.

The upper plate 300 and the lower plate 230 should be folded without any damage to provide the foldable display device. To this end, the upper plate 300 and the lower plate 230 may be have a very small thickness. Alternatively, each of the upper and lower plates 300 and 230 may be formed in a multi-layered structure. The upper and lower plates 300 and 230 having a small thickness may transfer an impact to elements of the display panel 200, and may cause the elements of the display panel 200 to be damaged by a transferred impact. Also, the upper and lower plates 300 and 230 having a small thickness may not maintain their original shapes because of their small elastic restoring force (or energy). On the other hand, the upper and lower plates 300 and 230 with the multi-layered structure may better endure an impact. However, each of the upper and lower plates 300 and 230 with the multi-layered structure may cause boundaries between different layers from one another to be visible due to differences of refractive indexes of the different layers from one another.

To address this matter, at least one of the upper and lower plates 300 and 230 of the foldable display device according to a first example embodiment of the present disclosure may be defined into a first area (or portion), a second area (or portion), and a third area (or portion). The first area (or portion) and the second area (or portion) may be disposed separately from each other.

The third area (or portion) may be interposed between the first area (or portion) and the second area (or portion) to contact with the first area and the second area. Also, the third area (or portion) may contact not only upper and lower surfaces of the first area (or portion) but also upper and lower surfaces of the second area. As such, the upper or lower plate 300 or 230 may have an enhanced folding performance. Also, a fold area (or a hinge area) of the upper or lower plate 300 or 230 may not be visible.

The first and second areas of the upper and lower plates 300 and 230 may be formed from a first material. The first material may have a first elastic modulus, e.g., rate of elasticity. The third areas of the upper and lower plates 300 and 230 may be formed from a second material. The second material may have a second elastic modulus. The second elastic modulus may be lower than the first elastic modulus. The first material may be a rigid material, and the second material may be a pliable material.

The first area and the second area of the upper plate 300 may be formed from a rigid material. For example, the first and second areas of the upper plate 300 may be formed from, e.g., PMMA (poly(methyl methacrylate)), PI (polyimide), PC (polycarbonate), ABS (acrylonitrile butadiene styrene), PET (polyethylene terephthalate), stainless steel, and/or a metal. However, the first and second areas of the upper plate 300 are not limited to the above-mentioned materials. In other words, any appropriate rigid material may be used to form the first and second areas of the upper plate 300.

The third areas of the upper and lower plates 300 and 230 may be formed from a pliable material having a long elastic length (e.g., a large tensile strength). For example, the third areas of the upper and lower plates 300 and 230 may be formed from, e.g., PU (polyurethane), TPU (thermoplastic polyurethane), PA (polyamide), silicon, and/or rubber. The third areas of the upper and lower plates 300 and 230 are not limited to the above-mentioned materials. In other words, any pliable material may be used to form the third areas of the upper and lower plates 300 and 230.

The upper plate 300 may be used as a cover window. In one example, the first and second areas of the upper plate 300 may be formed from a transparent rigid material. For example, the first and second areas of the upper plate 300 may be formed from one selected from a material group which includes PMMA (poly(methyl methacrylate)), PI (polyimide), PC (polycarbonate), ABS (acrylonitrile butadiene styrene), PET (polyethylene terephthalate) and a transparent metal. However, the first and second areas of the upper plate 300 are not limited to the above-mentioned materials. In other words, any one of different transparent rigid materials may be used as a formation material of the first and second areas of the upper plate 300.

Also, if the upper plate 300 is used as a cover window, the third area of the upper plate 300 may be formed from a transparent pliable material. For example, the third area of the upper plate 300 may be formed from, e.g., PU (polyurethane), TPU (thermo plastic polyurethane), and/or transparent rubber. However, the formation material of the third area of the upper plate 300 is not limited to the above-mentioned materials. In other words, any transparent pliable material may be used as the formation material of the third area of the upper plate 300.

In this manner, the upper plate 300 used as a cover window may allow not only the first and second areas to be formed from a transparent rigid material, but also the third area to be formed from a transparent pliable material. As such, a foldable cover window minimizing the generation of waviness without visualizing boundaries between the first through third areas may be realized.

The lower plate 230 may be a back plate. If the lower plate 230 is used as a back plate, the first area and second area of the lower plate 230 may be formed from one of transparent and opaque rigid materials. The third area of the lower plate 230 may be formed from one of transparent and opaque pliable materials when the lower plate 230 is used as a back plate.

The upper plate 300 and the lower plate 230 may be folded using the third area between the first area and the second area as a fold area (a hinge area). In other words, the upper plate 300 and the lower plate 230 may be folded with the third area, formed from the pliable material, as a center. As such, the generation of waviness in the fold area (e.g., the third area) of the upper and lower plates 300 and 230 may be prevented or minimized. Also, a boundary between the first area and third area and another boundary between the second area and the third area may not be visualized.

The foldable display device may be a liquid crystal display device. In one example, the foldable display device may further include a backlight unit (not shown) disposed on the rear surface of the display panel 200. The backlight unit may include a light source (not shown) and a housing configured to encompass the light source. The housing may be the foldable plate in accordance with a first embodiment of the present disclosure. Such a foldable plate of the present disclosure may be useful for a variety of purposes, such as the cover window, the back plate, the housing, or others.

A detailed shape of the upper plate 300 is shown in the example of FIG. 2. Also, the lower plate 230 may be the same shape as the upper plate 300. As such, the upper plate 300 will be described below in connection with its detailed shape and function. The lower plate 230 may have a similar function and structure as the upper plate 300, and the same description may apply thereto.

The upper plate 300 according to a first example embodiment of the present disclosure may be defined into a first area (or portion) 304, a second area (portion) 307, and a third area (portion) 301. The first area 304 may be adjacent to one edge of the upper plate 300. The second area 307 may be adjacent to the other edge of the upper plate 300.

In other words, the first area 304 and the second area 307 may be separate from each other. The third area 301 may contact upper and lower surfaces and one side surface of the first area 304. Also, the third area 301 may contact not only upper and lower surfaces and one side surface of the first area 304, but may also contact upper and lower surfaces and one side surface of the second of the second area 307. As such, an adhesive area between the first area 304 and the third area 301 of the upper plate 300 may be increased, and an adhesive force between the first area 304 and the third area 301 of the upper plate 300 may be enhanced. Similarly, an adhesive area between the second area 307 and the third area 301 of the upper plate 300 may be increased, and an adhesive force between the second area 307 and the third area 301 of the upper plate 300 may be enhanced.

The first area 304 may include a first body 303 and a first wing 302. The first body 303 and the first wing 302 may be formed in a single body united with each other. As such, a single-bodied first area 304 may be formed.

When the first body 303 is viewed in a first direction, the first body 303 may be a shape surrounded with a first edge 303a, a second edge 303b, a third edge 303c, and a fourth edge 303d. The first edge 303a may extend along a second direction perpendicular to the first direction. The third edge 303c may be separate from the first edge 303a, and may extend along the first direction. The second edge 303b may extend along a third direction perpendicular to the first direction and the second direction. The second edge 303b may be connected to one end of the first edge 303a and one end of the third edge 303c. The fourth edge 303 may be disposed separately from the second edge 303b, and may be connected to the other end of the first edge 303a and the other end of the third edge 303c. Also, the fourth edge 303d may be an edge of one side wall of the upper plate 300.

The first wing 302 may include a cured edge 302 when the first wing 302 is viewed in the first direction. For example, the first wing 302 may be a shape defined by a first curved edge 302a and a first straight edge 302b. One end of the first curved edge 302a may be connected to one end of the second edge 303b of the first body 303. One end of the first straight edge 302b may be connected to the other end of the second edge 303b of the first body 303. In other words, the first wing 302 may be a quarter circle shape when the first wing 302 is viewed in the first direction.

Also, the first body 303 and the first wing 302 of the first area 304 may extend along the first direction. In other words, the first body 303 and the first wing 302 may be continuously disposed in a manner extending from one side surface of the upper plate 300 toward another side surface opposite thereto.

The second area 307 includes a second body 306 and a second wing 305. The second body 306 and the second wing 305 may be formed in a single body united with each other. As such, the second area 307 may be formed in a single body.

The second body 306 may be a shape surrounded with a fifth edge 306a, a sixth edge 306b, a seventh edge 306c, and an eighth edge 306d, when the second body 306 is viewed in the first direction. The fifth edge 306a may extend along the second direction. The seventh edge 306c may be separate from the fifth edge 306a, and may extend along the second direction. The sixth edge 306b may extend along the third direction, and may be connected to one end of the fifth edge 306a and one end of the seventh edge 306c. The eighth edge 306d may be separate from the sixth edge 306b, and may be connected to the other end of the fifth edge 306a and the other end of the seventh edge 306c.

When the second wing 305 is viewed in the first direction, one edge of the second wing 305 may be formed in a curved line shape. For example, the second wing 305 may be a shape surrounded with a second curved edge 305a and a second straight edge 305b. One end of the second curved edge 305a may be connected to one end of the sixth edge 306b of the second bode 306, and one end of the second straight edge 305b may be connected to the other end of the sixth edge 306b of the second body 306. As such, the second wing 305 may be a quarter circle shape when the second wing 305 is viewed in the first direction.

Also, the second body 306 and the second wing 305 forming the second area 307 may be disposed continuously along the first direction. In other words, the second body 306 and the second wing 305 may be disposed continuously from one side surface of the upper plate 300 toward another side surface opposite thereto.

In this manner, the first wing 302 of the first area 304 and the second wing 305 of the second area 307 may each be formed in the quarter circle shape when they are viewed in the first direction. In accordance therewith, one boundary between the first area 304 and the third area 301 and another boundary between the second area 307 and the third area 301 may not be visible from a viewing point.

Meanwhile, the first curved edge 302a of the first wing 302 and the second curved edge 305a may be configured to each include lines perpendicular to each other. In other words, each of the first wing 302 and the second wing 305 may be formed in a tetragonal shape. In one example, one boundary between the first area 304 and the third area 301 and another boundary between the second area 307 and the third area 301 may be visible from a viewing point.

One interface between the first area 304 and the third area 301 and another interface between the second area 307 and the third area 301 may be inwardly curved along a depth direction of a fold area based on the viewing point, e.g., as a quarter-circular arc. In other words, when the first and second wings 302 and 305 of the upper plate 300 are viewed in the first direction, each of the first and second wings 302 and 305 may be formed in a curved line shape. As such, the boundaries of the first and second areas 304 and 307 may not be visible.

The first area 304 and the second area 307 may be symmetrical with each other at the third area 301, which may be disposed between the first area 304 and the second area 307. In other words, the first area 304 and the second area 307 may be symmetrical with each other based on the fold area of the upper plate 300.

The second area 307 may have a symmetrical shape with the first area 304 based on (e.g., about) the third direction. For example, the second body 306 of the second area 307 may have a symmetrical shape with the first body 303 of the first area 304 based on (e.g., about) the third direction. Also, the second wing 305 of the second area 307 may have a symmetrical shape with the first wing 302 of the first area 304 based on (e.g., about) the third direction.

When the first body 303 and the second body 306 are viewed in the first direction, the fifth edge 306a of the second body 306 may be symmetrical with the first edge 303a of the first body 303 based on (e.g., about) the third direction. Also, the sixth edge 306b of the second body 306 may be symmetrical with the second edge 303b of the first body 303 based on (e.g., about) the third direction. Moreover, the seventh edge 306c of the second body 306 may be symmetrical with the third edge 303c of the first body 303 based on (e.g., about) the third direction. Furthermore, the eighth edge 306d of the second body 306 may be symmetrical with the fourth edge 303d of the first body 303 based on (e.g., about) the third direction.

When the first wing 305 and the first wing 302 are viewed in the first direction, the second curved edge 305a of the second wing 305 may be symmetrical with the first curved edge 302a of the first wing 302 based on (e.g., about) the third direction. Also, the second straight edge 305b of the second wing 305 may be symmetrical with the first straight edge 302b of the first wing 302 based on (e.g., about) the third direction.

Also, when the upper plate 300 is viewed in the first direction, a distance between the bottom edge of the first area 304 and the bottom edge of the second area 307 may be larger than a curvature radius of the first curved edge 302a of the first wing 302 or a curvature radius of the second curved edge 305a of the second wing 305. In other words, the minimum distance between the first area 304 and the second area 307 may be larger than a curvature radius of the quarter circle. As such, the upper plate 300 may be completely folded.

The thickness of the upper plate 300 may be larger than those of the first area 304 and the second area 307. In accordance therewith, an exposure or display of the boundaries between the areas of the upper plate 300 may be prevented. Also, the deterioration of adhesive forces between the areas of the upper plate 300 may be prevented.

For example, if the upper plate 300 is used as a cover window, the thickness of the upper plate 300 may be in a range of about 1 mm~2 mm. When the thickness of the upper plate 300 is below 1 mm, the upper plate 300 may be easily damaged. On the other hand, when the thickness of the upper plate 300 is above 2 mm, the boundaries between the areas of the upper plate 300 may be visible (or exposed).

The thickness of the first area 304 and the second area 307 may be in a range of about 0.2 mm~0.8 mm. If the thickness of the first area 304 and the second area 307 is below 0.2 mm, it may be difficult to form of the first and second areas 304 and 307. On the other hand, when the thickness of the first area 304 and the second area 307 is above 0.8 mm, the curvature radius of the first curved edge 302a of the first wing 302 and the curvature radius of the second curved edge 305a of the second wing 305 may be enlarged. Due to this, the stress applied to the upper plate 300 should be increased.

Similarly, the lower plate 230 may have a larger thickness compared to those of its first and second areas. As such, the deterioration of adhesive forces between the areas of the lower plate 230 may be prevented.

If the upper plate 300 is used as a cover window, a difference between refractive indexes of the third area 301 and the first area 304 of the upper plate 300 may be less than 0.03. Also, another difference between the refractive indexes of the third area 301 and the second area 307 of the upper plate 300 may be less than 0.03. When the difference between the refractive index of the third area 301 and the refractive index of the first and second areas 304 and 307 is greater than 0.03, an optical distortion may be generated in the boundaries between the third area 301 and the first and second areas 304 and 307.

Such relationship between the refractive indexes may be applied only in a case where the upper plate 300 is used as a cover window. As such, the areas of the lower plate 230 may have a variety of refractive indexes. Because the lower plate 230 may be disposed on the rear surface of the display panel 200, the boundaries between the areas of the lower plate 230 may not be viewed without satisfying the above-mentioned refractive-index relationship. Also, although the foldable plate of the present disclosure is used as a housing, areas of the foldable plate may have a variety of refractive indexes.

Each of the upper and lower plates 300 and 230 according to a first example embodiment of the present disclosure may include the first and second areas 304 and 307, which may be formed from a first material, and the third area 301, which may be formed from a second material. In accordance therewith, a foldable plate without visible boundaries between its areas and without generating any waviness may be realized.

Figure 3:
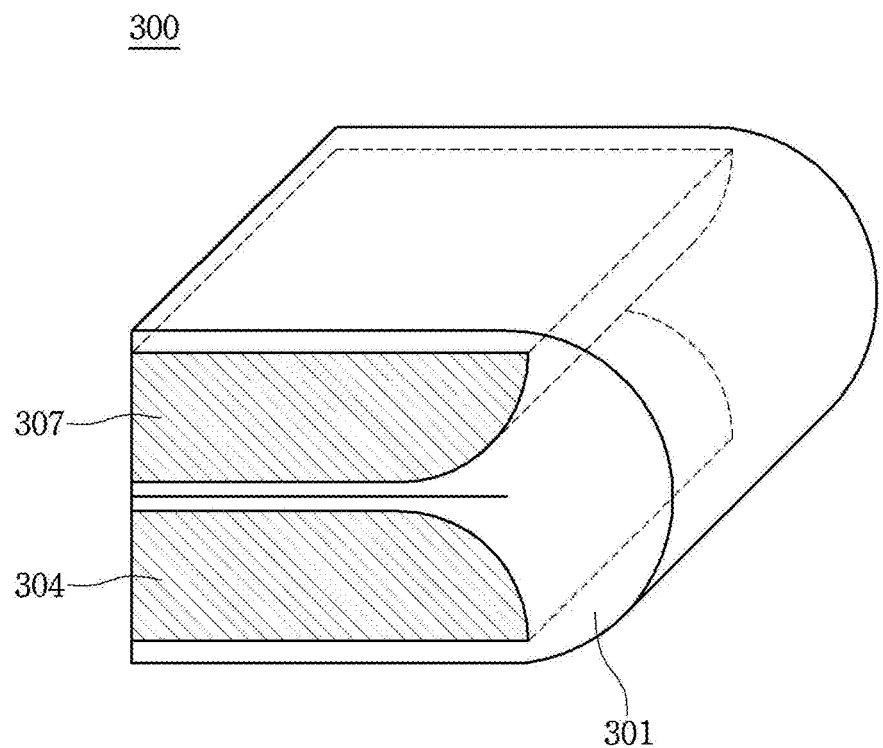
FIG. 3 is a perspective view showing a fold state of the foldable plate according to a first example embodiment of the present disclosure.

Subsequently, a fold state of the foldable plate according to a first example embodiment of the present disclosure will be described in detail. FIG. 3 is a perspective view showing a fold state of the foldable plate according to a first example embodiment of the present disclosure. Although not specifically shown in the drawings, the lower plate of the present disclosure may be folded in the same shape as the upper plate. As such, a fold state of the upper plate will be described as an example for both the upper and lower plates.

The upper plate 300 may include a first area 304, a second area 307, and a third area 301. Such an upper plate 300 may be folded with the third area 301 centered between the first area 304 and the second area 307. The fold may be a complete fold. The folded shape of the upper plate 300 is not limited to that shown in the FIG. 3 example. In other words, the upper plate 300 may be folded in a variety of shapes using the third area 301 as a hinge portion (or a fold area). Because the upper plate 300 may be folded using the third area, which is formed from a pliable material, as a fold area (or a hinge portion), the generation of waviness in the fold area of the upper plate 300 may be prevented.

If the upper plate 300 is used as a cover window, the difference between a refractive index of the third area 301 and a refractive index of the first and second areas 304 and 307 may be less than 0.03. As such, although the upper plate 300 may be folded and then unfolded, an optical distortion may not be generated in the upper plate 300. Alternatively, when the foldable plate of the present disclosure is used as one of a back plate and a housing, the refractive indexes of the first through third areas may have a variety of values without being limited to the above-mentioned refractive index relationship.

Figure 4:
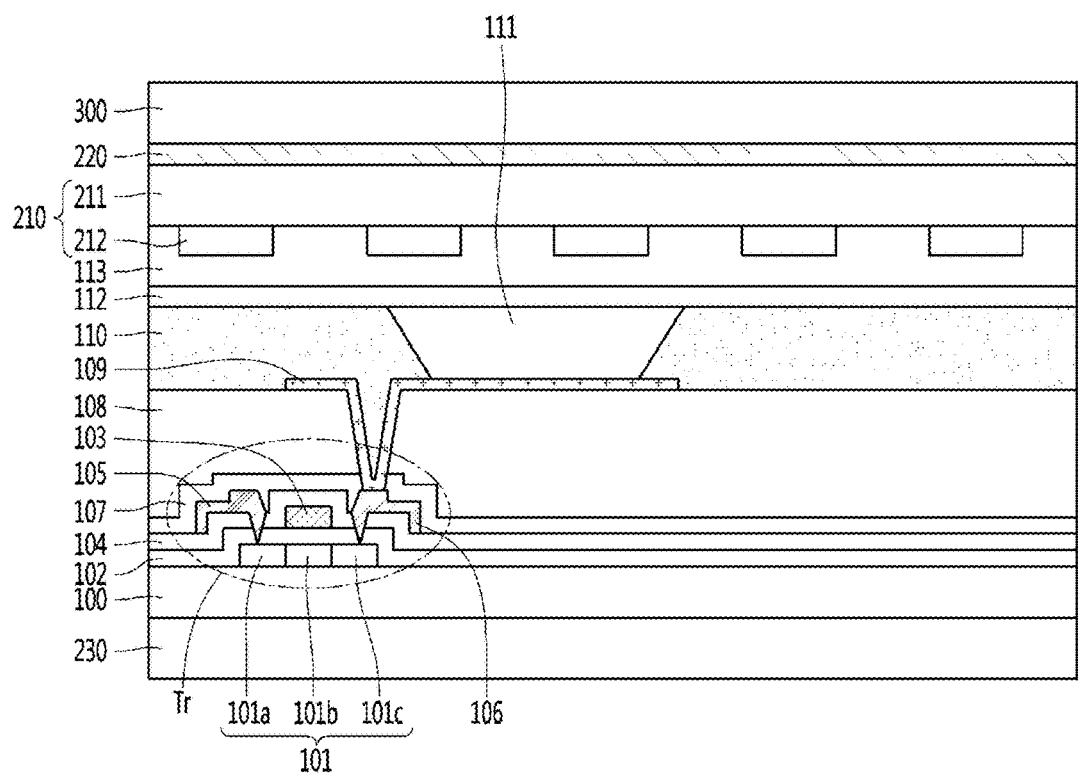
FIG. 4 is a detailed cross-sectional view showing a foldable display device according to an example embodiment of the present disclosure.

The foldable display device according to an embodiment of the present disclosure will be described in detail with reference to FIG. 4. FIG. 4 is a detailed cross-sectional view showing a foldable display device according to an example embodiment of the present disclosure.

With reference to the FIG. 4 example, the foldable display device according to an embodiment of the present disclosure may include a substrate 100 of a display panel disposed on a lower substrate 230. The foldable display device may further include a thin film transistor Tr and an organic light emitting element which may be disposed on the substrate 100.

Also, the foldable display device may include an upper plate 300 disposed on the substrate 100 provided with the thin film transistor Tr and the organic light emitting element. The lower plate 230, the display panel, and the upper plate 300 may be, respectively, a foldable back plate, a foldable display panel, and a foldable cover window. Although an organic light emitting diode display panel is shown in the drawing, the present disclosure is not limited to this. For example, the display panel of the foldable display device may be a liquid crystal display panel. In one example, the foldable display device may further include a backlight unit disposed on a rear surface of the liquid crystal display panel. The backlight unit may include a light source and a housing surrounding the light source. The housing may be include the foldable plate of the present disclosure.

The lower plate 230 disposed on the rear surface of the substrate 100 may include a first area, a second area, and a third area. The third area may be formed from a pliable material, and the first and second areas may be formed from a rigid material. As such, the lower plate 230 may be completely folded using the third area, disposed between the first area and the second area, as a fold area (or a hinge area).

The third area of the lower plate 230 may be disposed in contact with not only upper and lower surfaces and one side surface of the first area, but also with upper and lower surfaces and one side surface of the second area. Each of the first and second areas may include a body and a wing. The wing may be formed in a sectional structure of a quarter circle shape.

The thin film transistor Tr disposed on the substrate 100 may include a semiconductor layer 101, a gate electrode 103, a source electrode 105, and a drain electrode 106. The organic light emitting element may include a first electrode, an organic emission layer 111, and a second electrode 112.

The semiconductor layer 101 of the thin film transistor Tr may be disposed on the substrate 100. The semiconductor layer 101 may include a source domain 101a, a channel domain 101b, and a drain domain 101c. A gate insulation film 102 may be disposed on the entire surface of the substrate 100 provided with the semiconductor layer 101. The gate electrode 103 of the thin film transistor Tr may be disposed on the gate insulation film 102. Such a gate electrode 103 may overlap the channel domain.

An interlayer insulation film 104 may be disposed on the entire surface of the substrate 100 provided with the gate electrode 103. The source and drain electrodes 105 and 106 of the thin film transistor Tr may be disposed on the interlayer insulation film 104. The source electrode 105 and the drain electrode 106 may be connected to the source domain 101a and the drain domain 101c of the semiconductor layer 101 via contact holes that each sequentially penetrate through the interlayer insulation film 104 and the gate insulation film 102. In accordance therewith, the thin film transistor Tr may be disposed on the substrate 100.

A passivation film 107 may be disposed on the entire surface of the substrate 100 provided with the thin film transistor Tr. Also, a planarization film 108 may be disposed on the passivation film 108 on the substrate 100.

The first electrode 109 of the organic light emitting element, which may be connected to the drain electrode 106 of the thin film transistor Tr, may be disposed on a fixed region of the planarization film 108. The first electrode 109 may be an anode electrode of the organic light emitting element, but it is not limited thereto. Alternatively, the first electrode 109 may be a cathode electrode of the organic light emitting element.

A bank pattern 110 may be disposed on the planarization film 108 provided with the first electrode 109. The bank pattern 110 may expose a part of an upper surface of the first electrode 109, and may define the display panel into an emission region and a non-emission region. The emission region may correspond to a region surrounded with the bank pattern 110, and the non-emission region may correspond to another region occupied by the bank pattern 110.

The organic emission layer 111 may be disposed on the emission region surrounded by the bank pattern 110. The organic emission layer 111 may be formed in a single layer. Alternatively, to enhance a light emission efficiency, the organic emission layer 111 may be formed in a multi-layered structure, which may include a hole injection layer (HIL), a hole transport layer (HTL), an emission material layer (EML), an electron transport layer (ETL) and an electron injection layer (EIL).

The second electrode 112 of the organic light emitting element may be disposed on the bank pattern 110 and the organic emission layer 111. A sealing layer protecting the organic light emitting element from moisture and oxygen may further be disposed on the second electrode 112. An adhesion layer 113 may be disposed on the entire surface of the substrate 100 provided with the second electrode 112.

A touch panel 210 may be disposed on an upper surface of the adhesion layer 113. The touch panel 210 may include a base substrate 211 and sensing electrodes 212 arranged in one surface of the base substrate 211. The sensing electrodes 212 may include a plurality of first sensing electrodes and a plurality of second sensing electrodes. The first sensing electrodes and the second sensing electrodes may be arranged alternately with each other on one surface of the base substrate 211.

The touch panel 210 is not limited to the configuration shown in the drawing. For example, the touch panel 210 may be one of an on-cell type and an in-cell type. Also, any input device capable of inputting commands by touching with a finger, a stylus pen, etc., on a front surface of a display device may be used as the touch panel 210 of the present disclosure. Any touch panel may be applied as the touch panel 210 of the present disclosure.

A polarizing plate 220 may be disposed on the touch panel 210. The polarizing plate 220 may be formed as a single layer. Alternatively, the polarizing plate 220 may be formed in a multi-layered structure to enhance a light emission efficiency. Another adhesion layer may be interposed between the polarizing plate 220 and the upper plate 300.

The upper plate 300 may include a first area, a second area, and a third area. The third area of the upper plate 300 may be formed from a transparent pliable material, and the first area and the second area may be formed from a transparent rigid material. As such, the upper plate 300 may be completely folded with centering the third area which is interposed between the first area and the second area.

The third area of the upper plate 300 may contact not only upper and lower surfaces and one side surface of the first area, but also upper and lower surfaces and one side surface of the second area. Each of the first and second areas may include a body and a wing. The wing may have a sectional structure of a quarter circle shape.

Such a foldable display device may include a foldable upper plate and a foldable lower plate, which may each include the first area, the second area, and the third area. In accordance therewith, the foldable display device may be completely folded without any optical distortion.

Figure 5:
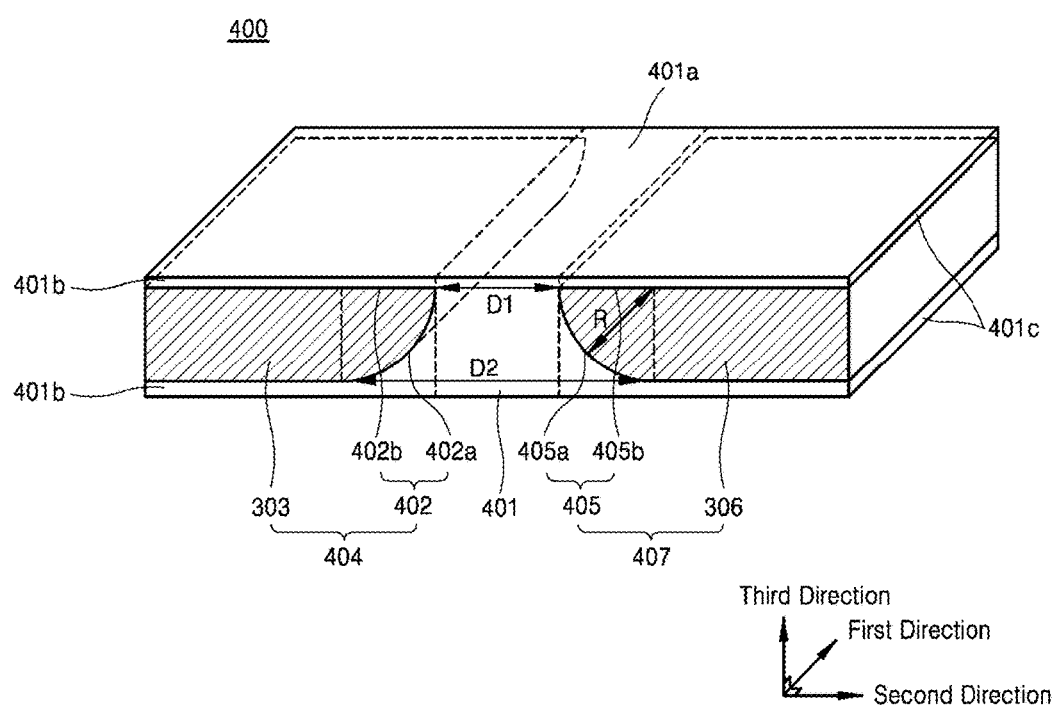
FIG. 5 is a perspective view showing a foldable plate according to a second example embodiment of the present disclosure.

A foldable plate according to a second example embodiment of the present disclosure will now be described in detail. FIG. 5 is a perspective view showing a foldable plate according to a second example embodiment of the present disclosure. The foldable plate of the second embodiment may include substantially similar components as the first embodiment. As such, components of the second embodiment that are the same as those of the previous embodiment will be referred to by the same reference numbers and names. Also, duplicate description will be omitted.

A detailed structure of the foldable plate 400 according to a second example embodiment of the present disclosure is shown in the example of FIG. 5. The foldable plate 400 may be one of an upper plate on a display panel and a lower plate under the display panel. The foldable plate 400 corresponding to the upper plate may be used as a cover window. The foldable plate 400 corresponding to the lower plate may be used as a back plate.

For the convenience of explanation, the foldable plate 400 according to a second example embodiment of the present disclosure, used as an upper plate, will be described. The lower plate of the present disclosure may have a similar function and structure as the upper plate 400, and the same description may apply thereto.

The upper plate 400 according to a second example embodiment of the present disclosure may include a first area 404, a second area 407, and a third area 401. The first area 404 and the second area 407 may be symmetrical with each other at (e.g., about) the third area 401 interposed between the first and second areas 404 and 407. In other words, the first area 404 and the second area 407 may be symmetrical with each other based on (e.g., about) a fold area (or a hinge area) of the upper plate 400.

The third area 401 may contact not only upper and lower surfaces of the first area 404, but also upper and lower surfaces of the second area 407. The first area 404 may include a first body 303 and a first wing 402. The second area 407 may include a second body 306 and a second wing 405.

When the first wing 402 and the second wing 405 are viewed in a first direction, each of the first and second wings 402 and 405 may include a curved edge. When the first wing 402 is viewed in the first direction, the first wing 402 may include a first curved edge 402a and a first straight edge 402b. Similarly, the second wing 405 may include a second curved edge 405a and a second straight edge 405b, when the second wing 405 is viewed in the first direction. As such, each of the first wing 402 and the second wing 405 may have a sectional structure of a fan shape. In other words, the first wing 402 and the second wing 405 may be formed in a sectional structure of a quarter circle shape, when the first and second wings 402 and 405 are viewed in the first direction.

A distance between a top edge of the first area 404 and a top edge of the second area 407 may be at least a curvature radius of the first curved edge 402a of the first wing 402 or the second curved edge 405a of the second wing 405, when the upper plate 400 is viewed in the first direction. Also, a minimum distance between the first area 404 and the second area 407 may be larger than a curvature radius of the quarter circled section of the first or second wing 402 or 405. In other words, a distance between a top edge of the first area 404 and a top edge of the second area 407 may be larger than a curvature radius of the first curved edge 402a or the second curved edge 405a. In accordance therewith, the upper plate 400 may be completely folded.

The distance between the top edge of the first area 404 and the top edge of the second area 407 may be shorter than a distance between a bottom edge of the first area 404 and a bottom edge of the second area 407. As such, not only a boundary between the first area 404 and the third area 401 may not be visible (or exposed) but also a boundary between the second area 407 and the third area 401 may not be visible (or exposed).

One interface between the first area 404 and the third area 401 and another interface between the second area 407 and the third area 401 may be outwardly curved along a depth direction of a fold area based on the viewing point, as a quarter-circular arc. In other words, when the first and second wings 402 and 405 of the upper plate 400 are viewed in the first direction, each of the first and second wings 402 and 405 may have a curved line shape. As such, the boundaries of the third area 401 and the first and second areas 404 and 407 may not be visible (or exposed).

Also, the first area 404 and the second area 407 may be formed from a transparent rigid material, and the third area 401 may be formed from a transparent pliable material. On the other hand, the foldable plate of the present disclosure used as a back plate may be formed in the same shape (or structure) as the upper plate 400. However, not only the first and second areas of the back plate may be formed from one of transparent and opaque rigid materials, but also the third area of the back plate may be formed from one of transparent and opaque pliable materials.

Such an upper plate 400 according to a second example embodiment of the present disclosure may include the first area 404, the second area 407, and the third area 401. As such, the foldable plate preventing (or minimizing) the generation of waviness may be realized.

Also, the upper plate 400 according to a second example embodiment of the present disclosure may enable not only a boundary between the third area 401 and the first area 404, but also another boundary between the third area 401 and the second area 407 to be not visible (or exposed).

Figure 6:
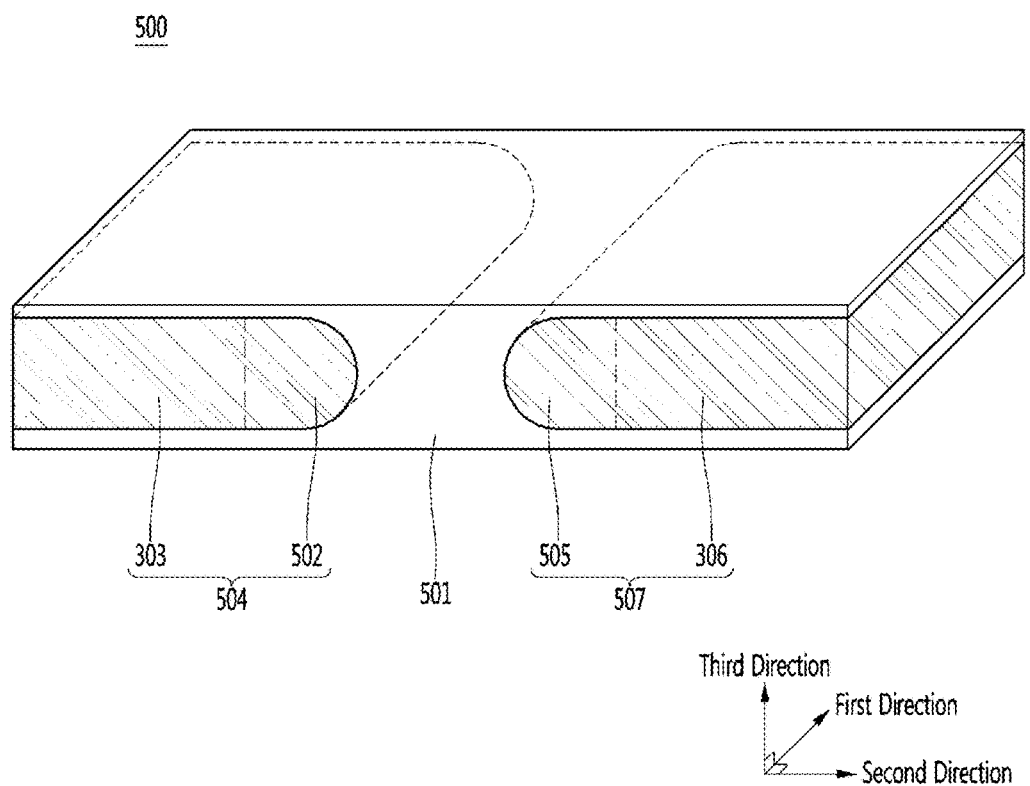
FIG. 6 is a perspective view showing a foldable plate according to a third example embodiment of the present disclosure.

Next, a foldable plate according to a third example embodiment of the present disclosure will be described in detail. FIG. 6 is a perspective view showing a foldable plate according to a third example embodiment of the present disclosure. The foldable plate of the third embodiment may include substantially similar components as the previous embodiment. As such, components of the third embodiment that are the same as those of the previous embodiments will be referred to by the same reference numbers and names. Also, duplicate description will be omitted.

A detailed structure of the foldable plate 500 according to a third example embodiment of the present disclosure is shown in the example of FIG. 6. The foldable plate 500 may be one of an upper plate on a display panel and a lower plate under the display panel. The foldable plate 500 corresponding to the upper plate may be used as a cover window. The foldable plate 500 corresponding to the lower plate may be used as a back plate.

For the convenience of explanation, the foldable plate 500 according to a third example embodiment of the present disclosure, which is used as an upper plate, will be described. The lower plate of the present disclosure may have a similar function and structure as the upper plate 500 of the third embodiment, and the same description may apply thereto.

The upper plate 500 according to a third example embodiment of the present disclosure may include a first area 504, a second area 507, and a third area 501. The first area 504 may include a first body 303 and a first wing 502. The second area 507 includes a second body 306 and a second wing 505.

When the first wing 502 and the second wing 505 are viewed in a first direction, each of the first wing 502 and the second wing 505 may be formed in a half-circle section structure.

Also, a minimum distance between the first area 504 and the second area 507 may be larger than a curvature radius of the half-circle. As such, the upper plate 500 used as a cover window may be completely folded.

Such an upper plate 500 according to a third example embodiment of the present disclosure may include the first area 504, the second area 507, and the third area 501. As such, the foldable plate preventing (or minimizing) the generation of waviness may be realized. Also, the first wing 502 and the second wing 505 of the upper plate 500 may be formed in the half-circle section structure. In accordance therewith, not only a boundary between the third area 501 and the first area 504 may not be visible (or exposed), but also another boundary between the third area 501 and the second area 507 may not be visible (or exposed).

One interface between the first area 504 and the third area 501 and another interface between the second area 507 and the third area 501 may protrude toward an inward direction of a fold area in a half-circular shape. In other words, each of the first and second wings 502 and 505 may have a curved line shape. As such, the boundaries of the third area 501 and the first and second areas 504 and 507 may not be visible (or exposed).

Figure 7A:
FIGS. 7A and 7B are photographs illustrating an evaluation of whether or not waviness and optical distortion are generated in a foldable plate according to an embodiment of the present disclosure.
Figure 7B:
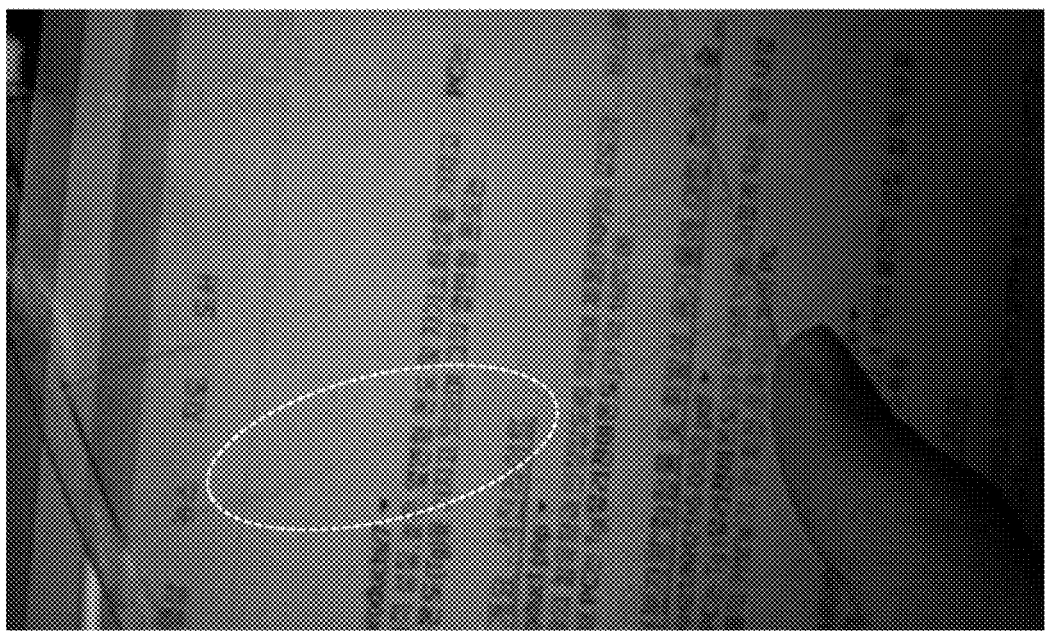

Whether or not waviness and optical distortion are generated in the foldable plate according to an embodiment of the present disclosure will now be described with reference to FIGS. 7A and 7B. FIGS. 7A and 7B are photographs illustrating an evaluation of whether or not waviness and optical distortion are generated in a foldable plate according to an embodiment of the present disclosure.

As shown in the FIG. 7A example, it can be seen that both edges of the foldable plate according to an embodiment of the present disclosure may come in contact with each other when the foldable plate is folded in a curvature of about 2.5 R, where R is the radius of the curve. Also, as shown in the FIG. 7B example, which depicts the FIG. 7A foldable plate after it is unfolded, it can be seen that no waviness or optical distortion is generated in a cover window when the foldable display device according to an embodiment of the present disclosure is folded and then unfolded.

Figure 8A:
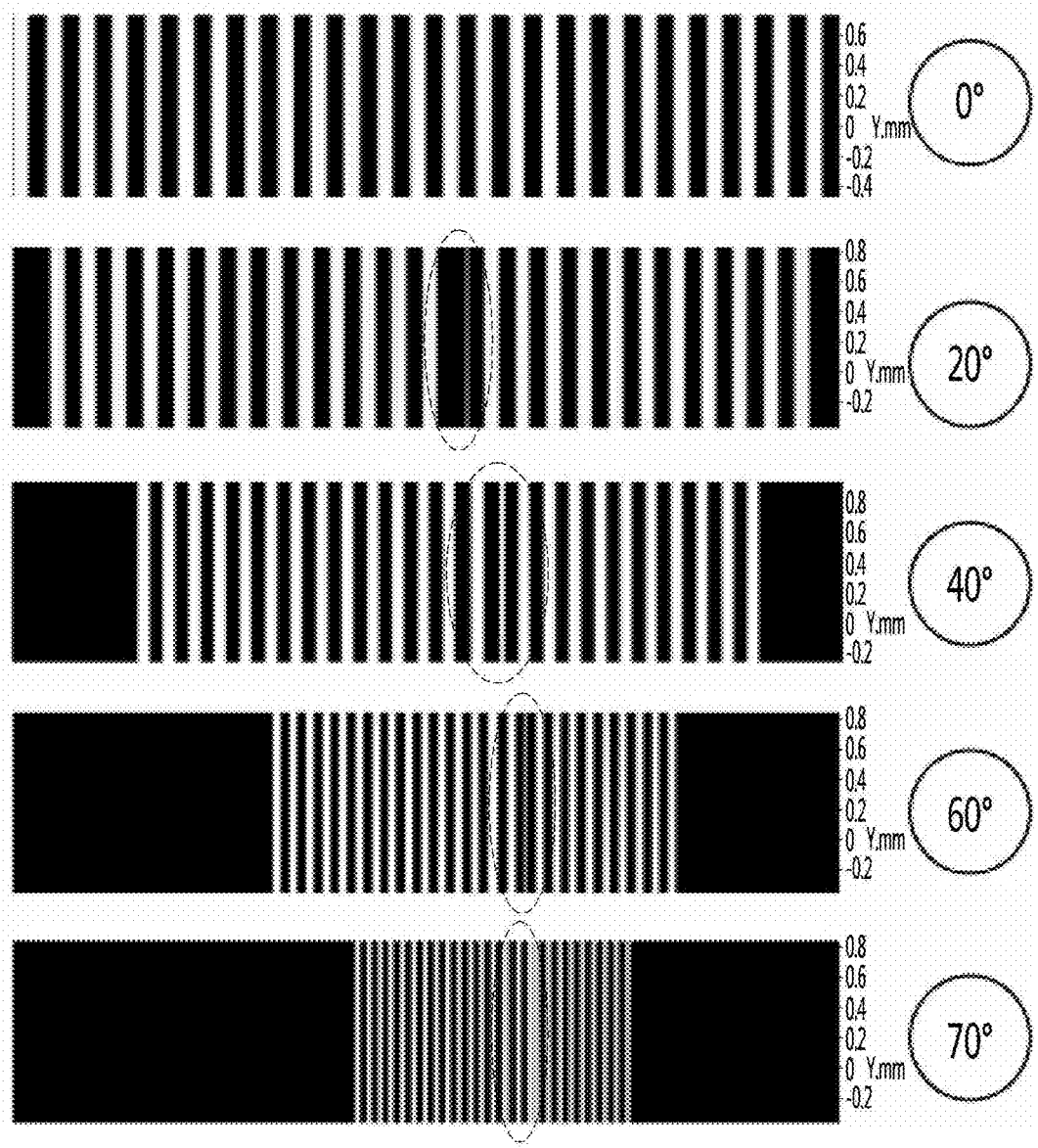
FIG. 8A is a graphical view of test results illustrating an evaluation of whether or not an optical distortion is generated in a foldable plate according to a related art device.
Figure 8B:
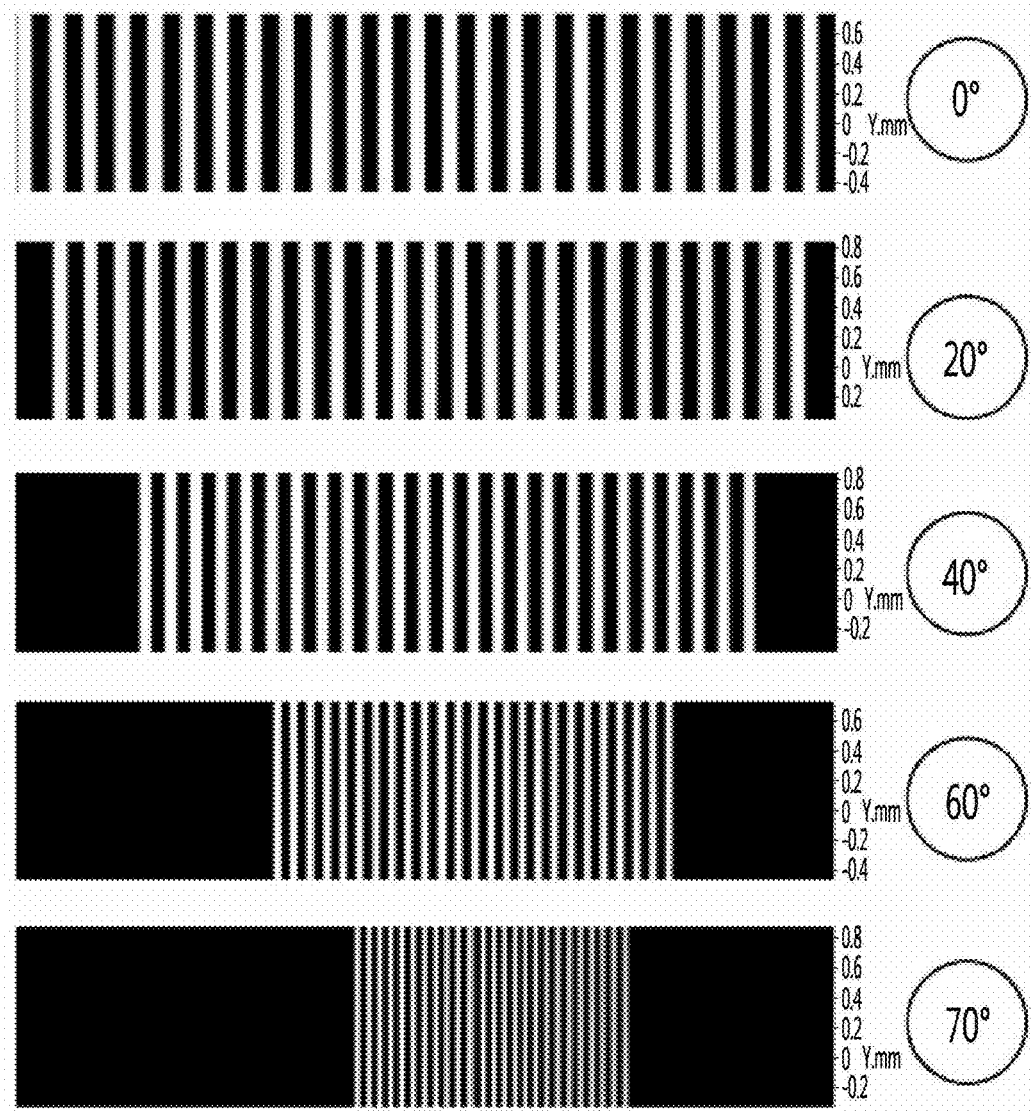
FIG. 8B is a graphical view of test results illustrating an evaluation of whether or not an optical distortion is generated in a foldable plate according to an embodiment of the present disclosure.

Whether or not an optical distortion is generated in the foldable plate according to an embodiment of the present disclosure will be described with reference to FIGS. 8A and 8B. FIG. 8A is a graphical view of test results illustrating an evaluation of whether or not an optical distortion is generated in a foldable plate in a related art device. FIG. 8B is a graphical view of test results illustrating an evaluation of whether or not an optical distortion is generated in a foldable plate according to an embodiment of the present disclosure.

FIG. 8A shows images representing whether or not the optical distortion is generated in the foldable plate of the related art. The foldable plate of the related art device includes first and second areas which each have a tetragonal shape when the foldable plate of the related art device is viewed in the first direction. The images shown in FIG. 8A are captured from the foldable plate of the related art device at viewing angles of 0°, 20°, 40°, 60°, and 70°.

As shown in FIG. 8A, the optical distortion is generated, not only at the viewing angle of 0°, but at other angles, as well. In other words, an optical distortion is generated whenever the foldable plate of the comparative embodiment is viewed in a front direction. It is evident that the optical distortion is generated in all the images, which are also captured from the foldable plate of the related art device at the viewing angles of 20°, 40°, 60°, and 70°.

In contrast, FIG. 8B shows images which are captured from the foldable panel of the present disclosure at the viewing angles of 0°, 20°, 40°, 60° and 70°. As seen from FIG. 8B, no optical distortion is generated in any of the images, which are captured from the foldable panel of the present disclosure at the viewing angles of 0°, 20°, 40°, 60°, and 70°. In other words, it is evident that the foldable plate according to a first example embodiment of the present disclosure does not generate any optical distortion, even though the viewing angle is changed.

Figure 9A:
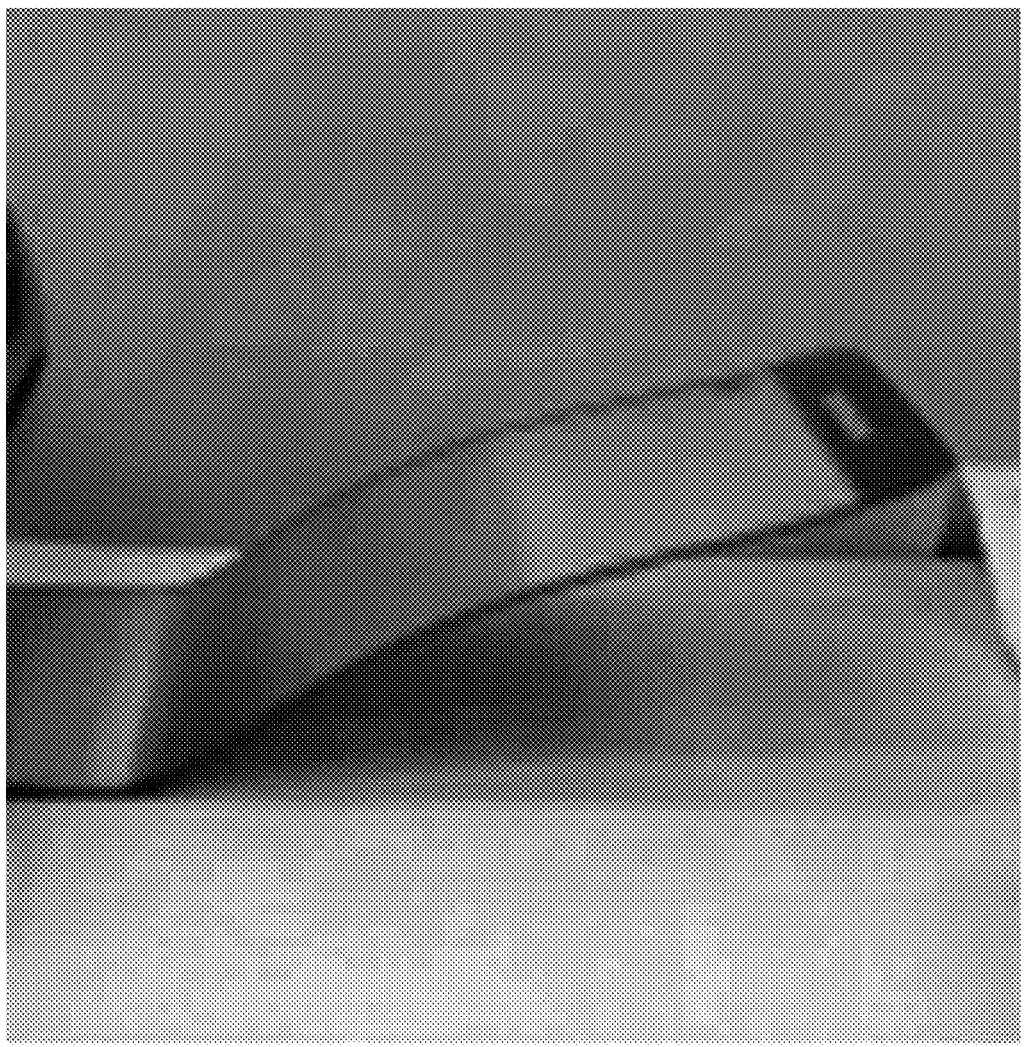
FIG. 9A is a photograph illustrating an evaluation of whether or not the generation of waviness in the foldable plate according to a PET back plate according to the related art.
Figure 9B:
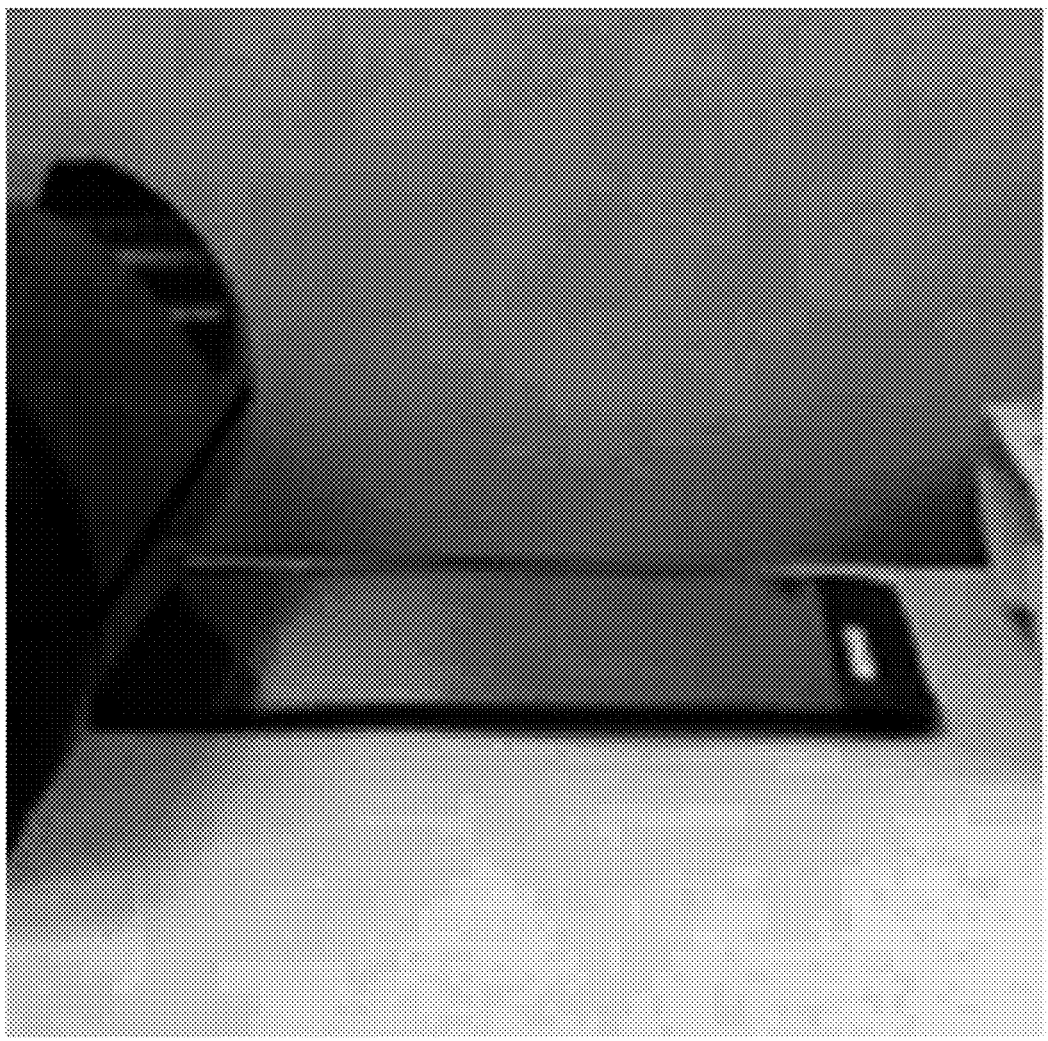
FIG. 9B is a photograph illustrating an evaluation of whether or not the generation of waviness in the foldable plate according to an embodiment of the present disclosure.

Subsequently, whether or not waviness is generated in the foldable plate according to an embodiment of the present and a PET back plate according to related art, which are unfolded from a folded state, will be described with reference to FIGS. 9A and 9B. FIG. 9A is a photograph illustrating an evaluation of whether or not the generation of waviness in the foldable plate according to a PET back plate according to the related art. FIG. 9B is a photograph illustrating an evaluation of whether or not the generation of waviness in the foldable plate according to an embodiment of the present disclosure.

The FIG. 9A photograph shows a PET back plate of the related art that is unfolded from a folded state. The related art back plate 30 plastic is deformed, such that the back plate 30 does not revert to its original shape when external force is removed. As shown in FIG. 9A, the waviness is generated in a fold area of the PET back plate of the related art.

In contrast, the FIG. 9B photograph shows the foldable plate according to an embodiment of the present disclosure that is unfolded from a folded state. As seen from the FIG. 9B example, it is evident that, in embodiments of the present disclosure, not only is no waviness, but also no external deformation is generated in the foldable plate of the present disclosure.

Figure 10A:
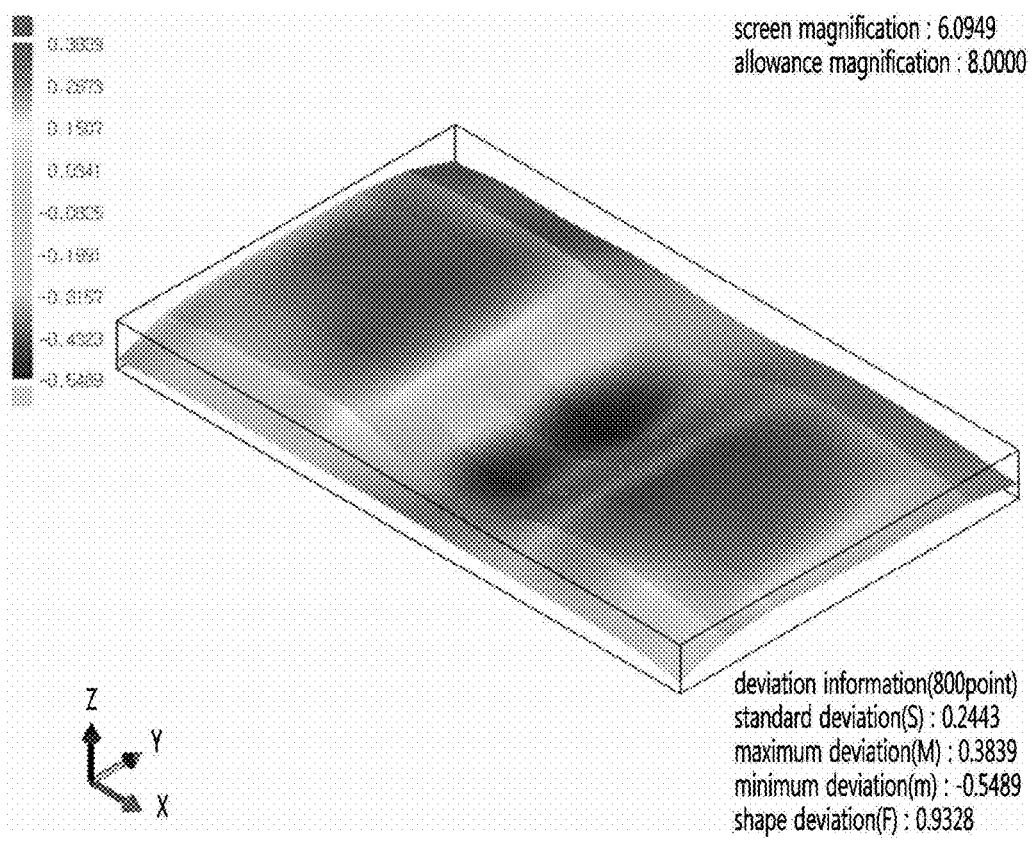
FIG. 10A is a photograph illustrating a flatness evaluation for a PET back plate according to the related art.
Figure 10B:
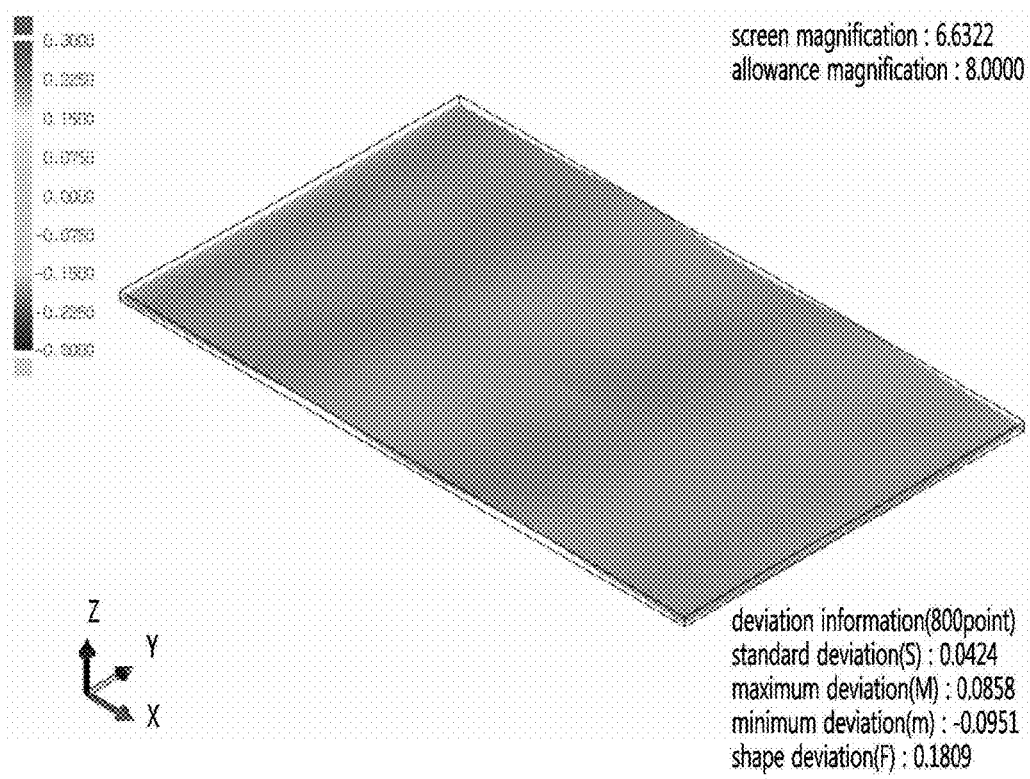
FIG. 10B is a photograph illustrating a flatness evaluation for a foldable plate according to an embodiment of the present disclosure.

Finally, flatnesses for a PET back plate according to the related art and a foldable plate according to an embodiment of the present disclosure, which are unfolded from a folded state, will be described with reference to FIGS. 10A and 10B. FIG. 10A is a photograph illustrating a flatness evaluation for a PET back plate according to the related art. FIG. 10B is a photograph illustrating a flatness evaluation for a foldable plate according to an embodiment of the present disclosure.

The FIG. 10A photograph was obtained by irradiating laser light onto the PET back plate of the related art, which was unfolded from the folded state, and measuring regional reflectance of the PET back plate. With reference to FIG. 10A, the flatness of the PET back plate according to related art largely deteriorates when the PET back plate is unfolded from the folded state. For example, a fold area (or a central portion) of the PET back plate and both adjacent areas thereto are largely depressed and protruded.

In contrast, the FIG. 10B photograph was obtained by irradiating laser light onto the foldable plate of the present disclosure, which was unfolded from the folded state, and measuring regional reflectance of the foldable plate of the present disclosure. As seen from the FIG. 10B example, it is evident that the foldable plate of the present disclosure maintains an almost flat surface. Particularly, it is confirmed that the fold area (or the central portion) of the foldable plate of the present disclosure is almost evenly maintained.

It will be apparent to those skilled in the art that various modifications and variations may be made in the present disclosure without departing from the spirit or scope of the invention. Thus, it is intended that embodiments of the present disclosure cover the modifications and variations of this invention provided they come within the scope of the appended claims and their equivalents.

What is claimed is:

1. A foldable display device, comprising: a display panel; and a cover window on the display panel, the cover window comprising: a first area comprising a first material having a first elastic modulus and a plate-like shape; a second area comprising the first material having a plate-like shape symmetrical with the first area, the second area being separate from the first area; and a third area comprising a second material having a second elastic modulus lower than the first elastic modulus, wherein the third area comprises: a first portion interposed between the first area and the second area, a second portion, extending from the first portion, contacting and covering upper and lower surfaces of the first area, and a third portion, extending from the first portion, contacting and covering upper and lower surfaces of the second area, and wherein the first and second areas are aligned with each other along a fan shape end portion thereof with a gap therebetween that can be folded or unfolded with the display panel.

2. The foldable display device of claim 1, wherein the first material and the second material are transparent.

3. The foldable plate of claim 1, wherein a difference between a refractive index of the third area and a refractive index of the first and second areas is less than 0.03.

4. The foldable display device of claim 1, wherein the cover window is configured to be folded with the third area centered between the first area and the second area.

5. A foldable display device, comprising: a display panel; and a back plate attached to a surface of the display panel, the back plate comprising: a first area comprising a first material having a first elastic modulus and a plate-like shape; a second area comprising the first material having a plate-like shape symmetrical with the first area, the second area being separate from the first area; and a third area comprising a second material having a second elastic modulus lower than the first elastic modulus, wherein the third area comprises: a first portion interposed between the first area and the second area, a second portion, extending from the first portion, contacting and covering upper and lower surfaces of the first area, and a third portion, extending from the first portion, contacting and covering upper and lower surfaces of the second area, and wherein the first and second areas are aligned with each other along a fan shape end portion thereof with a gap therebetween that can be folded or unfolded with the display panel.

6. The foldable display device of claim 5, wherein the back plate is configured to be folded with the third area centered between the first area and the second area.

* * * * *